March 18, 1947. R. E. COX 2,417,678

WORK HANDLING APPARATUS

Filed Dec. 30, 1944

Inventor:
Ralph E. Cox,
by Harry E. Dunham
His Attorney.

Patented Mar. 18, 1947

2,417,678

UNITED STATES PATENT OFFICE 2,417,678

WORK HANDLING APPARATUS

Ralph E. Cox, Schenectady, N. Y., assignor to General Electric Company, a corporation of New York Application December 30, 1944, Serial No. 570,659

2 Claims. (Cl. 214—1)

My invention relates to work handling apparatus, more particularly to supporting and handling apparatus for an article being heated, and has for its object a simple and low cost apparatus for inserting a work piece or article into a heating coil while continuously rotating the work piece.

In carrying out my invention in one form, I provide a carriage movable on a track for supporting the work piece in such manner that the carriage may be moved to insert the work piece in the heating coil. I also provide means on a support or carriage for rotating the work piece while it is being heated, thereby to provide for uniform heating. This means, in one form of my invention, comprises two pairs of rollers on which the work piece is placed and which support the work piece, these rollers being adjustable and rotated by an electric motor thereby to rotate the work piece.

Figure 1:
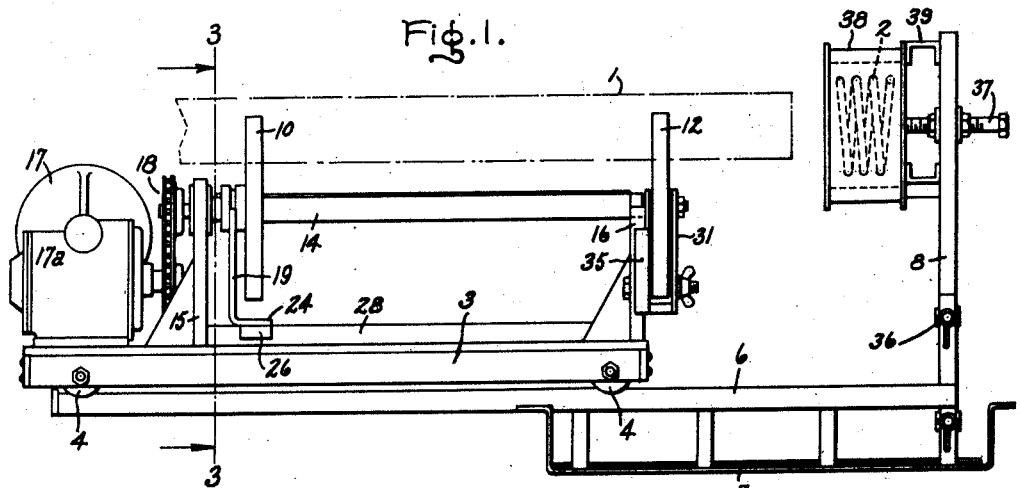
Figure 2:
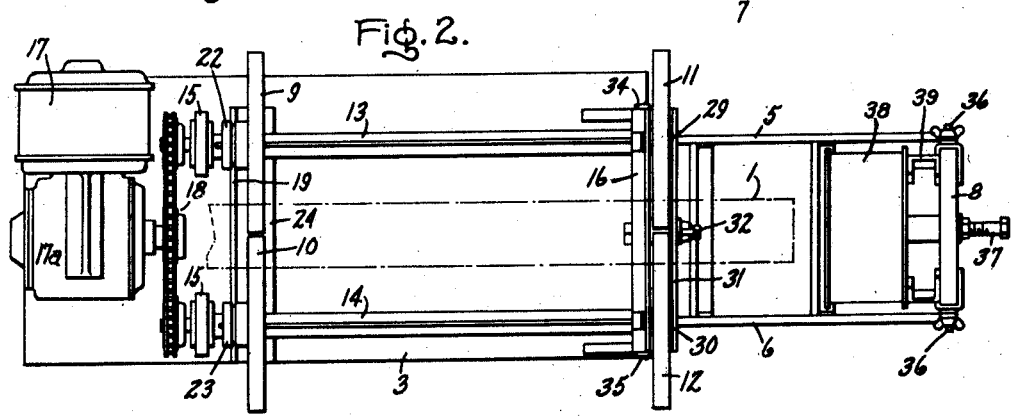
Figure 3:
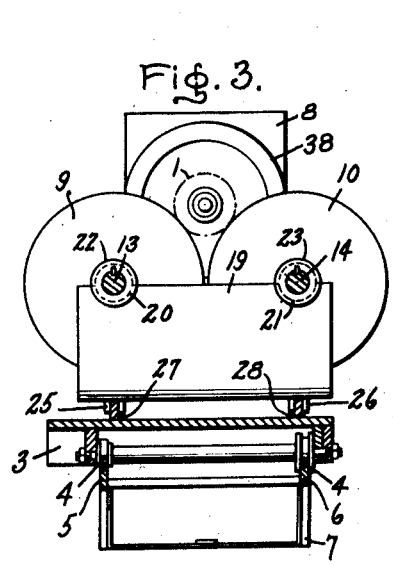
Figure 4:
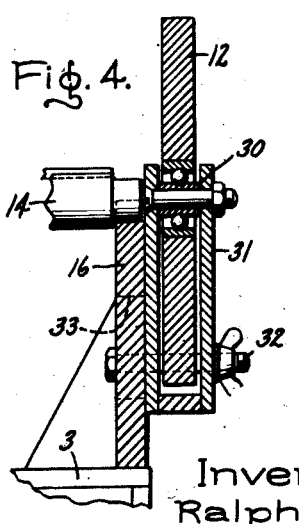

For a more complete understanding of my invention, reference should be had to the accompanying drawing, Fig. 1 of which is a view in elevation of high frequency heating apparatus embodying my invention; Fig. 2 is a plan view of the aparatus shown in Fig. 1; Fig. 3 is a sectional view along the line 3—3 of Fig. 1 looking in the direction of the arrows; while Fig. 4 is an enlarged view in section showing details of construction.

Referring to the drawing, I have shown my invention in one form as applied to the supporting and rotating during heating and hardening of a cylindrical article or work piece 1 when its end is inserted for heating and quenching in an induction heating coil 2 surrounded by a quench ring.

The article to be heated is mounted or placed on a carriage 3 mounted on rollers 4 which, in turn, travel on two rails 5 and 6 forming a guide or track. The rails are secured to a common support 7 on which also is an upright arm 8 forming a support for the heating coil 2 and quench ring whose common axis is parallel with the track.

The article 1 is actually supported on the carriage on two pairs of rollers 9, 10 and 11, 12 mounted on the carriage, with the axes of the rollers substantially parallel and the rollers of each pair adjacent each other. As shown, the rollers 9, 10 are mounted respectively on shafts 13 and 14 in splined relation with the shafts so that they are adjustable lengthwise of the shafts for different lengths of articles. The shafts in turn are rotatably mounted on upright supports 15 and 16 secured to the carriage 3. By means of an electric motor 17 mounted on the carriage 3, the shafts 13 and 14 and the rollers 9 and 10 are continuously rotated in the same direction. As shown, the motor is mechanically connected to the shafts through a speed reducing gearing 17a and by means of a chain and sprocket wheel drive 18. Thus a rod or other article placed on the two pairs of rollers is continuously rotated by the driven rollers 9 and 10.

A mechanical connection is provided between the two rollers 9 and 10 so as to maintain them in a common plane when they are adjusted lengthwise of the shafts 13 and 14. This connection consists of an upright plate member 19 provided with two substantially semi-circular notches 20 and 21 in its upper edge, the walls of which lie in flanged hubs 22 and 23 secured to the rollers. At its lower end the plate 19 is provided with a substantially horizontal transversely extending portion 24 on the lower side of which are two pairs 25 and 26 of spaced apart guide members which embrace two parallel guiding bars 27 and 28 mounted on top of the carriage 3 and secured rigidly thereto. Therefore, by means of the guides 25 and 26 the plate 19 is maintained in a position substantially at right angles with the shafts 13 and 14, with which the guides 27 and 28 are parallel, when the rollers 9 and 10 are adjusted manually lengthwise of the shafts. In this way the rollers are maintained in a common plane for any adjustment of the rollers in accordance with the length of the article to be heated.

The two rollers 11 and 12 are mounted on bearings 29 and 30 secured to a separate supporting member 31 having a U-shaped cross section, as shown in Fig. 4. This support 31 is in turn secured by a clamping bolt 32 to the support 16. An elongated slot 33 is provided in the support 16 for the bolt 32 whereby by loosening the bolt the support 31 and the two rollers can be raised or lowered with respect to the carriage 3. Upright guide flanges 34 and 35 are provided on opposite sides of the support 31, which flanges engage opposite sides of the bracket 16 so as to hold the support 31 in a predetermined angular relation with the bracket 16 whereby the axes of the rollers 11 and 12 are maintained in a plane which is parallel with the carriage 3 and parallel with the shafts 13 and 14.

In the use of the heating apparatus, the rollers 9 and 10 are moved manually lengthwise of the shafts to accommodate a long or short rod article to be heated while the rollers 11 and 12 are adjusted in a vertical direction to bring the rod 1 to a position substantially concentric with the coil 2 and quench ring. Likewise, the coil 2 and quench ring may be adjusted vertically by adjustment bolts 36.

The carriage is moved to its extreme left-hand position, as shown in Figs. 1 and 2, and the rod 1 placed on the rollers, the motor 17 being in operation to turn the rollers 9 and 10, whereby the rod is continuously rotated after being placed on the rollers. Then the carriage is moved manually toward the right to bring the right-hand end of the rod into the coil 2 and quench ring into engagement with an adjustable stop 37. It is assumed that the coil 2 is energized with a current of a suitable high frequency whereby the end of the rod in the coil is heated. When the end of the rod is heated to the desired hardening temperature, the end of the rod is quenched and then the carriage is moved toward the left to withdraw the rod from the coil.

Preferably, as shown, the helical heating coil 2 is suitably mounted on electrically insulating supports (not shown) inside of an annular quench ring 38 which is secured to the upright arm 8 by means of suitable brackets 39. The inner wall of the quench ring 38 is provided with a plurality of apertures. When the end of the rod is heated to the desired temperature, water is admitted to the quench ring under a suitable pressure and sprayed through the holes in the quench ring between the turns of the coil onto the end of the rod so as to quench it.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

What I claim as new and desire to secure by Letters Patent of the United States is:

1. Handling apparatus for an elongated work piece comprising a support provided with a track, a carriage mounted for movement back and forth on said track, two shafts on said carriage in parallel spaced relation with each other and extending substantially parallel with said track, a roller mounted on each of said shafts for rotation with said shaft and for slidable movement lengthwise of said shaft, a member connecting said rollers together so as to maintain them substantially in a common plane when they are moved lengthwise of said shaft, a driving motor on said carriage connected to turn said shafts and rollers in the same direction, a second pair of rollers, and a support for said second pair of rollers supporting said rollers at the end of said shafts with their axes substantially parallel with said shafts whereby an elongated work piece placed on said rollers is rotated by said first pair of rollers while said carriage is moved on said track.

2. Handling apparatus for an elongated work piece comprising a support provided with a track, a carriage mounted for movement back and forth on said track, two shafts on said carriage in parallel spaced relation with each other and extending substantially parallel with said track, a roller mounted on each of said shafts for rotation with said shaft and for slidable movement lengthwise of said shaft, a member connecting said rollers together so as to maintain them substantially in a common plane when they are moved lengthwise of said shafts, a driving motor on said carriage connected to turn said shafts and rollers in the same direction thereby to rotate a work piece placed thereon, a second pair of rollers, a support for said second pair of rollers supporting said rollers at the end of said shafts with their axes substantially parallel with the axes of said shafts, and means for adjusting said support thereby to adjust said second pair of rollers and adjust the position of one end of an elongated work piece placed on said two pairs of rollers.

RALPH E. COX.

REFERENCES CITED

The following references are of record in the file of this patent:

UNITED STATES PATENTS

| Number | Name | Date |
| --- | --- | --- |
| 1,453,358 | Kettering | May 1, 1923 |
| 2,260,260 | Mikesh | Oct. 21, 1941 |
| 2,282,322 | Denneen et al. | May 12, 1942 |
| 2,308,788 | Somes | Jan. 19, 1943 |
| 2,359,167 | Somes | Sept. 26, 1944 |
| 2,359,273 | Somes | Sept. 26, 1944 |